(12) United States Patent
Keller et al.

(10) Patent No.: US 11,866,050 B2
(45) Date of Patent: Jan. 9, 2024

(54) METHOD AND DEVICE FOR OPERATING A VEHICLE ASSISTANCE SYSTEM

(71) Applicants: Daimler AG, Stuttgart (DE); Robert Bosch GmbH, Stuttgart (DE)

(72) Inventors: Christoph Gustav Keller, Stuttgart (DE); Holger Mielenz, Ostfildern (DE)

(73) Assignees: Daimler AG, Stuttgart (DE); Robert Bosch GmbH, Stuttgart (DE)

( * ) Notice: Subject to any disclaimer, the term of this patent is extended or adjusted under 35 U.S.C. 154(b) by 238 days.

(21) Appl. No.: 17/290,288

(22) PCT Filed: Sep. 19, 2019

(86) PCT No.: PCT/EP2019/075150
§ 371 (c)(1),
(2) Date: Apr. 30, 2021

(87) PCT Pub. No.: WO2020/088841
PCT Pub. Date: May 7, 2020

(65) Prior Publication Data
US 2021/0380103 A1    Dec. 9, 2021

(30) Foreign Application Priority Data
Nov. 1, 2018  (DE) .................... 10 2018 127 342.8

(51) Int. Cl.
*B60W 60/00*   (2020.01)
*B60W 30/095*  (2012.01)
(Continued)

(52) U.S. Cl.
CPC ........ *B60W 40/06* (2013.01); *B60W 30/0956* (2013.01); *B60W 30/10* (2013.01);
(Continued)

(58) Field of Classification Search
CPC .. B60W 40/06; B60W 30/0956; B60W 30/10; B60W 30/165; B60W 60/0011;
(Continued)

(56) References Cited

U.S. PATENT DOCUMENTS

2004/0082435 A1 * 4/2004 Schmitt ................. B60W 10/02
                                                       477/77
2008/0291276 A1   11/2008 Randler
(Continued)

FOREIGN PATENT DOCUMENTS

DE    102011121487 A1   6/2013
DE    102012201896 A1   8/2013
(Continued)

OTHER PUBLICATIONS

German Patent Office, German Office Action in Application No. DE10 2018 127 342.8, dated Oct. 17, 2019, 6 pages. Munich, Germany.
(Continued)

*Primary Examiner* — Abby Y Lin
*Assistant Examiner* — Danielle Marie Jackson
(74) *Attorney, Agent, or Firm* — Marshall & Melhorn, LLC

(57) ABSTRACT

A method and a device for operating a vehicle assistance system in that the environment of the vehicle and objects located in the vehicle are determined using detected signals from an environment sensor system. Using the method and device it may be determined whether the roadway lying ahead of the vehicle driving in an automated driving mode is snow-covered and has tire tracks. In the event the tire tracks are there, and depending on the determined course of the tire tracks for the vehicle, a decision is made as to whether a journey along these tire tracks is critical.

7 Claims, 3 Drawing Sheets

(51) Int. Cl.
  *B60W 30/10* (2006.01)
  *B60W 30/165* (2020.01)
  *G06V 20/56* (2022.01)
  *B60W 40/06* (2012.01)

(52) U.S. Cl.
  CPC ...... *B60W 30/165* (2013.01); *B60W 60/0011* (2020.02); *G06V 20/56* (2022.01); *G06V 20/588* (2022.01); *B60W 2420/42* (2013.01); *B60W 2510/1005* (2013.01); *B60W 2520/10* (2013.01); *B60W 2520/12* (2013.01); *B60W 2555/20* (2020.02)

(58) Field of Classification Search
  CPC ..... B60W 2420/42; B60W 2510/1005; B60W 2520/10; B60W 2520/12; B60W 2555/20; B60W 60/0015; B60W 2552/00; G06V 20/56; G06V 20/588
  See application file for complete search history.

(56) References Cited

U.S. PATENT DOCUMENTS

| | | |
|---|---|---|
| 2011/0060478 A1 | 3/2011 | Nickolaou |
| 2013/0211720 A1 | 8/2013 | Niemz |
| 2016/0001780 A1 | 1/2016 | Lee et al. |
| 2016/0379065 A1 | 12/2016 | Hartmann |
| 2017/0010618 A1* | 1/2017 | Shashua ............. G01C 21/1652 |
| 2017/0144658 A1 | 5/2017 | Viehmann |
| 2017/0371336 A1 | 12/2017 | Mei et al. |
| 2018/0273040 A1* | 9/2018 | Arndt ................... G05D 1/0251 |
| 2019/0294167 A1* | 9/2019 | Kutila ................ G01C 21/3461 |
| 2020/0249681 A1* | 8/2020 | Chase ..................... B60K 35/00 |
| 2020/0324787 A1* | 10/2020 | Wang ..................... B60W 40/02 |

FOREIGN PATENT DOCUMENTS

| | | |
|---|---|---|
| DE | 102012014450 A1 | 1/2014 |
| EP | 1680317 A1 | 7/2006 |
| JP | 2006321421 A | 11/2006 |
| WO | 2012110030 A2 | 8/2012 |
| WO | 2017184061 A1 | 10/2017 |
| WO | 2018026603 A1 | 8/2018 |

OTHER PUBLICATIONS

European Patent Office, International Search Report Application PCT/EP2019/075150, dated Jan. 13, 2020, 6 pages. Rijswijk, Netherlands.

China National Intellectual Property Administration, Office Action in Application No. CN201980066617.4, dated Aug. 15, 2023, 10 pages.

* cited by examiner

METHOD AND DEVICE FOR OPERATING A VEHICLE ASSISTANCE SYSTEM

FIELD

The invention relates to a method and device for operating an assistance system of a vehicle, a surrounding area of the vehicle and objects present therein being determined by means of captured signals of a surrounding area sensor system. The invention further relates to a device for performing the method.

BACKGROUND

A driver assistance method and a driver assistance system for snowy roads are known from DE 10 2012 201 896 A1. A surrounding area of the vehicle is thereby captured by means of an optical sensor and a driving channel formed by the tracks of preceding vehicles is recognized from the captured data. If the vehicle departs from the driving channel, a signal is output to the driver.

A driver assistance method and a driver assistance device are also known from EP 1 680 317 A1. The driver assistance method is based on lane information, wherein driver information or steering intervention is triggered as a function of the lane information. The lane information is determined by means of an image of a camera, wherein the lane information consists of lane data, and initial lane data is determined on the basis of the image information by means of lane edge markings. Additional lane data is determined on the basis of other information determined on the basis of the image of the camera as an alternative to lane edge markings. The additional information is determined on the basis of at least one preceding or oncoming vehicle or tracks of at least one preceding vehicle or roadway edge boundaries or guardrails or the curb or lane edge structures, from which a course of the roadway is derived.

The initial lane data and the additional lane data are then combined into the lane data used for the driver assistance method.

SUMMARY

The object of the invention is to disclose an improved method relative to the prior art and an improved device for operating an assistance system of a vehicle.

The object is achieved according to the invention by means of the features disclosed in the claims with respect to the method and with respect to the device.

Advantageous embodiments of the invention are the subject-matter of the subclaims.

A method for operating an assistance system of a vehicle provides that a surrounding area of the vehicle and objects present therein are determined using captured signals of a surrounding area sensor system. According to the invention, it is thereby determined whether a roadway ahead of a vehicle driving in automated driving mode is covered with snow and comprises tire tracks, wherein, in the case that tire tracks are detected, the course thereof is determined, particularly the course and shape thereof, and it is decided as a function thereof whether traveling along said tire tracks is critical for the vehicle. The term "automated driving mode" thereby refers to both a partially automated driving mode and a highly automated driving mode or fully automated driving mode.

Driving along the tire tracks is advantageously considered to be critical when the determined course of the tire tracks, particularly the course and shape of the tire tracks, is an indicator of the presence of a slippery road surface. By means of said features of the tire tracks, it can namely be determined whether a vehicle leaving said tire tracks has performed a drifting motion, fishtailing motion, or slipping motion. Such motions are critical for the vehicle with respect to the driving stability of the vehicle and are evaluated as an indication of the presence of a slippery road surface.

By applying the method, a vehicle driving in automated driving mode is enabled to derive a trajectory for automated vehicle guiding on snow-covered roadways, such that the risk of slippery subsurface conditions is at least minimized by analyzing and interpreting the tire tracks of a preceding vehicle.

The safety of the vehicle and of other drivers in the immediate surrounding area of the vehicle can thus be substantially increased, wherein acceptance of automated driving mode can also be increased.

The method is applied particularly if the roadway is covered with snow, such that the surrounding area sensor system cannot detect roadway markings.

In one embodiment of the method, for the case that traveling along the tire tracks is critical, a trajectory spaced apart from said tire tracks and through undriven snow is determined. The trajectory is determined for the vehicle particularly if it is determined by means of analyzing and interpreting the tire tracks that the roadway is relatively slippery and there is a danger of slippage.

In one refinement of the method, said determined trajectory is used as the basis of automated guiding of the vehicle, so that the vehicle travels adjacent to the tire tracks of the preceding vehicle and thus the danger of slippage is at least reduced. The vehicle thus drives on a segment of the roadway on which no tire tracks are currently detected.

In one potential embodiment, the tire tracks are determined on the snow-covered roadway at least by means of a contrast and/or color difference. The tire tracks can thus be detected, analyzed, and interpreted relatively easily.

Using the course and shape of the tire tracks, a substrate condition of the roadway is determined, wherein specific features are evaluated to this end in order to particularly determine whether the preceding vehicle has slipped. Under slippery conditions, vehicles often begin to fishtail, wherein the fishtailing is detectable by means of the course and shape of the tire tracks.

In addition, a further potential embodiment provides that a starting position of a preceding vehicle is determined using the course and the shape of the tire tracks. If the roadway is slippery, then the starting position is indicated by a wider tire track, as the so-called spin-out of the drive wheels can be classified as drifting.

In one potential refinement of the method for automated vehicle guiding, a speed and a transmission position of the vehicle are determined depending on the course and shape of the tire tracks. The vehicle is thereby largely optimally operated in automated driving mode depending on the present conditions of the roadway, so that slipping and the associated danger to the vehicle and to traffic participants present in the immediate vicinity thereof can be largely prevented.

The invention further relates to a device for performing the method, wherein a control unit connected to the surrounding area sensor system, particularly of the assistance system, determines on the basis of captured signals of the surrounding area sensor system whether a roadway ahead of the vehicle traveling in automated driving mode is covered with snow and comprises tire tracks, wherein the control unit determines the course and shape of any tire tracks and the control unit decides, depending on the determined course and shape, whether traveling along said tire tracks is critical for the vehicle.

The control unit evaluates the captured signals of the surrounding area sensor system, wherein a result with respect to the tire tracks can be used as the basis of further guiding of the vehicle in automated driving mode and the risk of slippage of the vehicle is thereby at least reduced.

For the case that traveling along the tire tracks is critical, the control unit determines a trajectory spaced apart from said tire tracks and through undriven snow. The control unit particularly determines said trajectory if it has been analyzed and interpreted that the roadway is relatively slippery in the region of the tire tracks.

The invention further relates to a vehicle having such a device for performing the method. The vehicle is particularly a so-called shuttle and/or robo-taxi.

DESCRIPTION OF THE FIGURES

Embodiment examples of the invention are explained in greater detail below using a drawing.

Shown is.

DESCRIPTION

Figure 1:
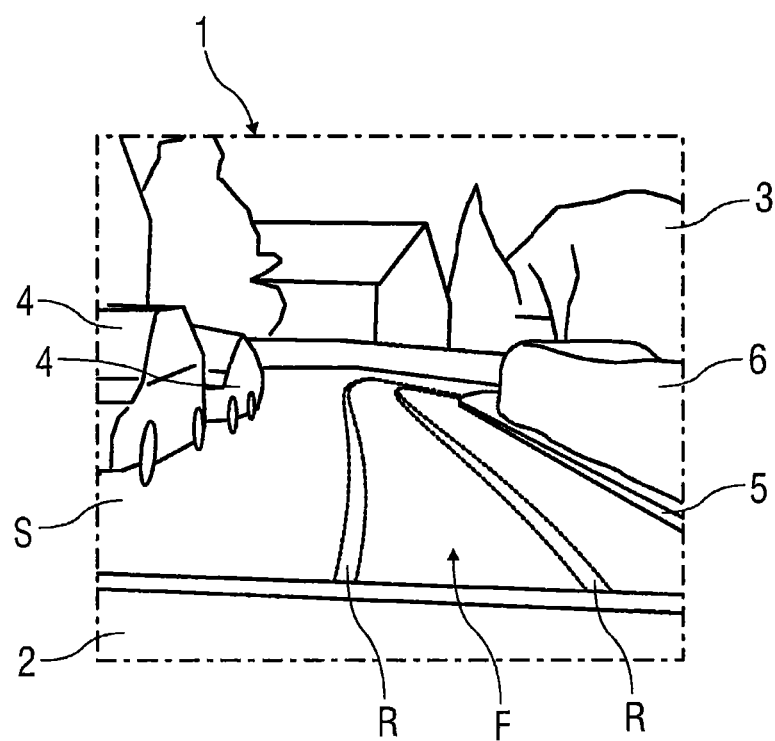
FIG. 1 A schematic view of a detail of a vehicle traveling on a snow-covered roadway.
Figure 2:
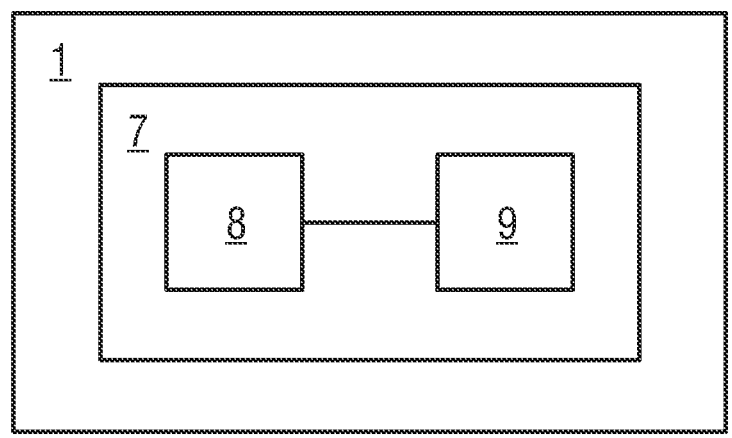
FIG. 2 shows vehicle 1, device 7, control unit 8 and surrounding area sensor system 9.
Figure 3:
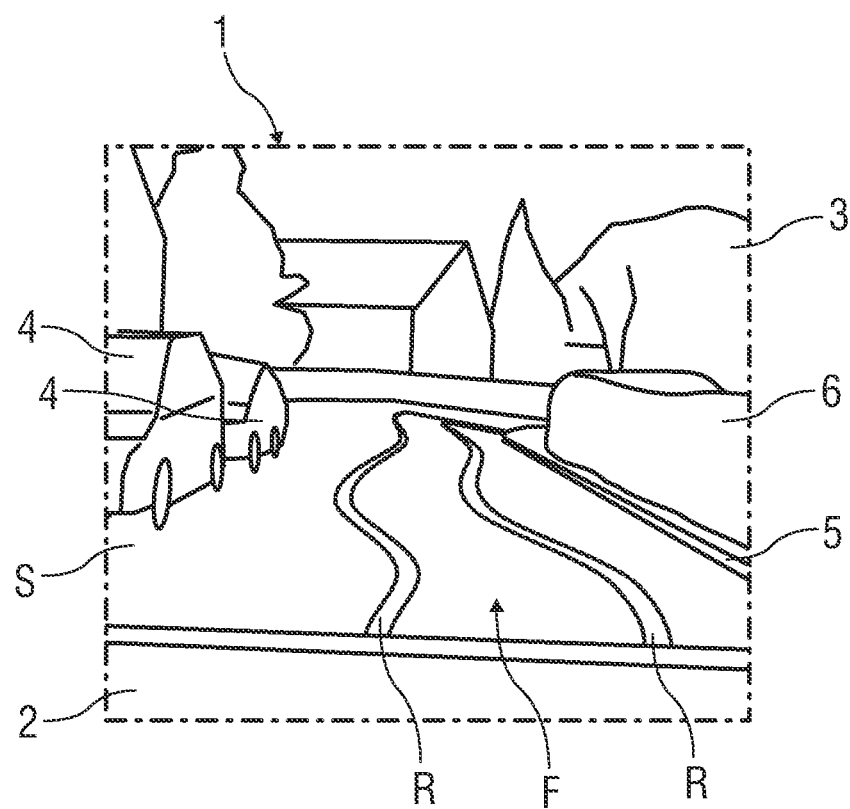
FIG. 3 shows as difference to FIG. 1 the shape/course of tire tracks R that would cause the determination "critical" according to claim 11.

FIG. 1 shows a detail of a vehicle 1 traveling on a snow-covered roadway F.

A detail of an instrument panel 2 and of a windshield 3 of the vehicle 1 are shown.

The vehicle 1 travels in automated driving mode, wherein the vehicle 1 has an assistance system in the vehicle 1, not shown in any more detail, for completely taking over a driving task of the vehicle 1.

A component of the assistance system is a surrounding area sensor system having a plurality of detecting units disposed in and/or on the vehicle 1. A least one detecting unit is thereby implemented as a video camera, wherein the other detecting units can be, for example, lidar, radar, and/or ultrasonic-based sensors. The surrounding area sensor system is connected to the control unit of the assistance system for evaluating and further processing captured signals.

In order to optimize the behavior of the vehicle 1 in automated driving mode under wintry conditions, a method as described below is provided.

The method thereby uses tire tracks R of a vehicle, not shown in more detail, preceding the vehicle 1 and apparent in the snow S on the roadway F.

According to the present embodiment example, there is so much snow S present on the roadway F that a lane marking is not visible and thus cannot be captured by the surrounding area sensor system of the vehicle 1.

A lane of the vehicle 1, corresponding to applicable traffic rules, is derived by means of map information, of characteristics determined using captured signals of the surrounding area sensor system and/or using expanded objects such as additional parked vehicles 4, a curb 5, a garden fence, and/or a hedge 6.

The tire tracks R of a preceding vehicle are also determined using the captured signals of the surrounding area sensor system, particularly the camera. The tire tracks R are particularly determined using contrasts and/or color differences between the snow S and present tire tracks R. In addition or alternatively, said tire tracks are detected by adapting lane models using vehicle data and by classifying the adapted lines as tire tracks R.

With respect to the captured tire tracks R, the appearance thereof, particularly the course thereof or the course and shape thereof, are determined, wherein the course, particularly the curved course, and the shape, particularly the width progression, is used for determining a subsurface condition of the roadway F, particularly for determining whether said roadway is slippery.

Under slippery conditions, vehicles often begin to fishtail, wherein said fishtailing is evident from the course of the tire tracks R, and can thus be detected.

Furthermore, it is possible to use the course and shape of the tire tracks R to analyze traffic positions at which at least one vehicle preceding the vehicle 1 has driven. One such traffic position is a bus stop, a right-before-left situation, or the like. If the roadway F is slippery, then the tire tracks R, at the point of starting, are characterized by a wide line, as the spinning out of the drive wheels causes drifting of the same.

For the vehicle 1, driving along tire tracks R of a vehicle having previously fishtailed or drifted is critical, because this means that the vehicle 1 could also begin fishtailing or drifting. The fishtailing or drifting is a critical driving condition for the vehicle 1 and should be avoided as much as possible.

Analyzing and evaluating the appearance of the tire tracks R, particularly the features of course and shape thereof, can be done by image processing, for example, wherein tire tracks R having a course typical of fishtailing or drifting motions are identified based on a learning method.

The information with respect to the course and shape of the tire tracks R in the snow S by a preceding vehicle can be used for deriving a trajectory for the vehicle 1 in two ways.

For one, a speed and a gearshift position to be set at the vehicle 1 can be determined for the vehicle 1, in order to prevent the vehicle wheels of the vehicle 1 from spinning out if said vehicle follows the tire tracks R, and for another, a trajectory can be determined for guiding the vehicle 1.

To this end, it is possible that the vehicle 1 follows the tire track R of the preceding vehicle in the region where no critical regions have been determined, particularly with respect to slipperiness.

For the determined critical regions, the trajectory for the vehicle 1 is determined such that said trajectory guides the vehicle 1 through undriven snow S when the roadway F is covered with snow. Said determined trajectory then becomes the basis for automated guiding of the vehicle 1, that is, the automated driving mode thereof. This means that an initial trajectory of the vehicle 1, initially forming the basis of the automated driving mode, is replaced by a new, modified trajectory at the determined critical regions, so that the critical regions are avoided.

According to a potential embodiment of the method, weather data provided to the vehicle 1 by means of a weather service is considered, particularly with respect to formation of slippery ice.

LIST OF REFERENCES

1 Vehicle
2 Instrument panel

3 Windshield
4 Parked vehicle
5 Curb
6 Hedge
F Roadway
R Tire track
S Snow

What is claimed is:

1. A method for operating an assistance system of a vehicle, a surrounding area of the vehicle being determined via captured signals of a surrounding area sensor, comprising:
- determining whether a roadway ahead of a vehicle traveling in an automated driving mode is covered with snow and comprises tire tracks, wherein:
- if tire tracks are present, the course thereof is determined, and
- it is decided, depending on the determined course of the tire tracks, whether traveling along said tire tracks is critical,
- wherein for the case that traveling along the tire tracks is critical, a trajectory spaced apart from said tire tracks and through undriven snow is determined,
- wherein said determined trajectory then becomes the basis for automated guiding for control of the vehicle,
- wherein traveling along the tire tracks is determined to be critical when a course and a shape of the tire tracks is an indicator of the presence of a slippery road surface such that the tire tracks indicate they were created by a drifting motion, fishtailing motion, or slipping motion.

2. The method according to claim 1, wherein the shape of the tire tracks is additionally determined and the decision as to whether traveling along said tire track is critical is made depending on the determined course and depending on the determined shape of the tire tracks.

3. The method according to claim 1, wherein the tire tracks are determined on the snow-covered roadway at least via a contrast and/or color difference.

4. The method according to claim 1, wherein using the course and shape of the tire tracks, a substrate condition of the roadway is determined.

5. The method according to claim 1, wherein a starting position of a preceding vehicle is determined using the course and the shape of the tire tracks.

6. The method according to claim 1, wherein a control unit connected to the surrounding area sensor system determines on the basis of captured signals of the surrounding area sensor system whether a roadway ahead of the vehicle traveling in automated driving mode is covered with snow and comprises tire tracks, wherein
- if tire tracks are present, the control unit determines the course and shape thereof, and
- the control unit determines whether traveling along said tire tracks is critical for the vehicle, depending on the determined course and shape.

7. The method according to claim 6, wherein for the case that traveling along the tire tracks is critical, the control unit determines a trajectory spaced apart from said tire tracks and through undriven snow.

* * * * *